Dec. 20, 1960

R. C. REYNOLDS ET AL 2,965,753

PRODUCTIVITY WELL LOGGING

Filed Dec. 8, 1955

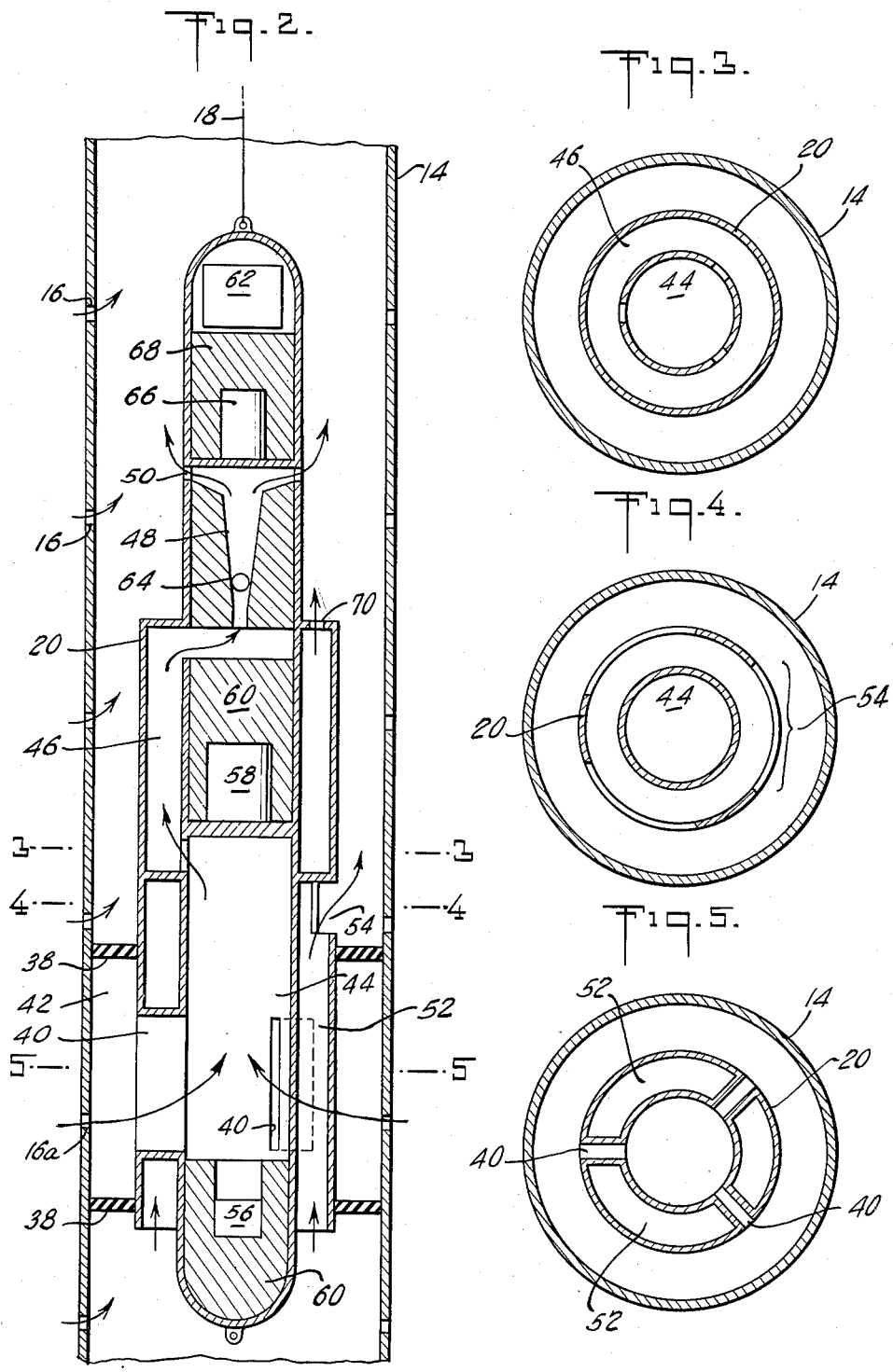

United States Patent Office 2,965,753
Patented Dec. 20, 1960

2,965,753

PRODUCTIVITY WELL LOGGING

Ralph C. Reynolds, Houston, and Alexander S. McKay, Bellaire, Tex., assignors to Texaco Inc., a corporation of Delaware Filed Dec. 8, 1955, Ser. No. 551,756

12 Claims. (Cl. 250—43.5)

This invention relates mainly to oil-well production and more particularly to a method and an apparatus by means of which an accurate determination can be made of the nature of the fluid, i.e., gas, oil or water flowing into a bore hole or well at a particular depth and the rate of flow of the fluid as it enters the well at that particular depth. By conducting this operation progressively through the bore hole or a section thereof information will be had as to where gas, oil and/or water are entering the hole and the flow rates thereof.

In oil-well production it is of course desirable if not essential to know the depth and thickness of a formation from which a fluid such as gas, oil or water is entering the hole. In many instances two or all three of these fluids may be flowing into the hole at the same time from different zones or formations and it is obviously desirable to know the location of these zones. Thus, if it is found that water is entering the hole at a particular location remedial steps can be taken to stop this flow as by cementing or otherwise plugging the formation. In the case of gas or oil it is desirable to know the location of the flow and also the rate of flow from each of the producing formations. A record showing this information is frequently termed a "productivity log."

In a copending patent application Serial No. 546,352, filed November 14, 1955, in the names of Edmond F. Egan, Gerhard Herzog and Joseph C. Allen, a method and an apparatus are described for determining the nature of the fluid flowing into a bore hole or well from a formation and the depth or location of that formation. In the method described in that application a device is passed through the bore hole while suspended from a wire line or cable, the device containing an instrument for measuring the densities of the well fluid at different points in the well, particularly opposite the producing formations. The density of the fluid opposite such a producing formation will be indicative of the nature of the fluid, i.e., whether it is gas, oil or water and by correlating this information with the depth of the instrument in the hole the desired data will be obtained. While the method described in the Egan et al. application has the merit of simplicity it is of course true that the fluid density at a given depth results from the mixing of all of the fluid entering the hole below that depth. Again in the method described in the Egan et al. application the rate of flow of the well fluid is measured at the surface and therefore is not a true measure of the rate of flow of the fluid entering the hole at a particular depth or from a predetermined zone. While different ways might be devised for measuring the fluid flow rate within a narrow vertical zone in the bore hole such as by using a "spinner" or by ejecting a tracer such as a radioactive substance into the bore hole fluid below the logging tool and then measuring the time required for the tracer to move up to a detector in the hole, such a system would still be a measure of the integrated effect of all fluid entering the bore hole below the point of measurement.

In accordance with the present invention a method and an apparatus have been provided through the use of which accurate information can be obtained as to the nature of any fluid or fluids flowing into the bore hole at any depth in the hole as well as the rate of flow of such a fluid or fluids at that particular depth.

In carrying out the invention a tool or instrument is adapted to be passed through the bore hole while suspended from a suitable cable and the position or depth of the instrument is known at any time from the indication of the amount of cable in the hole. The instrument is provided with one or more chambers or passages and flexible sealing means for temporarily closing the annular space between the exterior of the instrument housing and the interior of the casing, if such is present. The flexible sealing means are arranged to provide a vertically narrow confined space around a portion of the instrument housing and the fluid entering the bore hole into the space is caused to enter one of the chambers within the instrument through which it passes upwardly into the bore hole space above the instrument, and so on to the surface. Means are provided within the instrument and associated with the chamber therein for making a continuous measurement of the density of the fluid passing through the chamber. Instead of density other characteristics of the fluid can be measured such as the electrical resistivity thereof. From these measurements of density, resistivity or the like information will be had as to the nature of the fluid passing into the hole within the confined space around the instrument and this data will be an indication as to whether the fluid is gas, oil or water or a combination of any two or all three of these fluids.

Within the instrument and also associated with the above-mentioned chamber therein is a means for measuring the flow rate of the fluid passing through the chamber and this will, of course, be a measurement of the exact flow rate of the fluid entering the bore hole at the depth under examination. The instrument is also provided with a vertical by-pass chamber or passage through which fluid below the instrument can pass upwardly into the hole above the instrument without affecting the measuring of the density or the flow rate of the fluid entering opposite the instrument. Thus the instrument can be passed freely upwardly or downwardly through the hole for the making of a continuous log of the hole or a portion thereof or it can be held at any desired depth in the hole for measuring the characteristics of the fluid entering the hole at that depth.

As will be explained in further detail hereinafter, in a slightly modified form the instrument can be utilized in a method for determining the permeabilities of formations traversed by the hole. In this modification, fluid such as water, oil or gas can be pumped downwardly in the bore hole and a portion of the fluid caused to enter any particular zone or area of the formation wall. The rate of flow of that portion of the fluid entering the permeable formation will be measured at that exact point and this will provide an indication of the permeability of the formation at that point. By repeating these operations in this manner a so-called "injectivity permeability profile log" can be made.

For a better understanding of the invention, reference may be had to the accompanying drawing in which:

Fig 2 is an enlarged vertical sectional view through one form of instrument in the hole;

Figure 6:
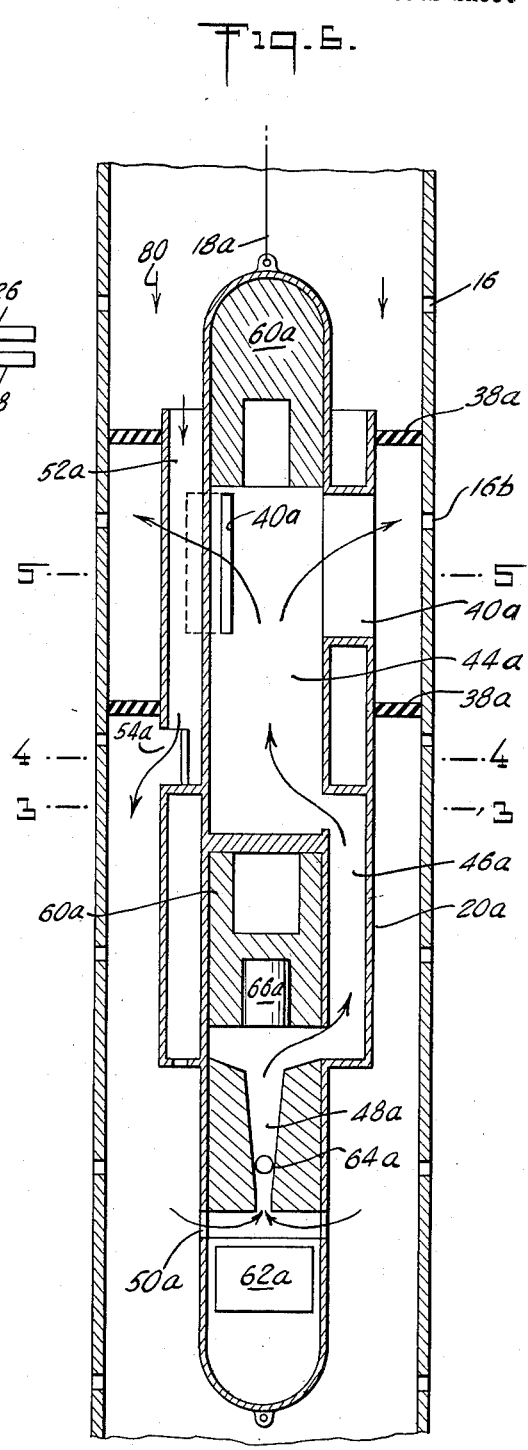

Figs. 3, 4 and 5 are sectional views taken on the lines 3—3, 4—4 and 5—5 respectively of Fig. 2; and Fig. 6 is a vertical sectional view of the instrument of Fig. 2 but in a reversed or upside down position as used in making an injectivity log of the bore hole.

Figure 1:
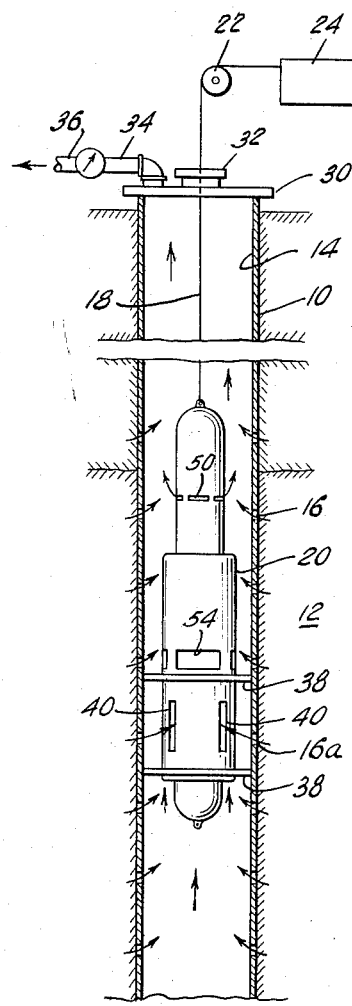
Fig. 1 is a vertical sectional view through a portion of a bore hole or well showing an instrument therein for carrying out the method of this invention.

Referring to the drawing and particularly to Fig. 1 thereof a well or bore hole 10 is shown as traversing several subsurface formations including the producing formation 12. The bore hole is shown as provided with a casing 14 containing perforations 16 opposite the formation 12 but it is to be understood that the invention is not limited to use within a cased well and can be used in an open hole. Shown as suspended from a conductor cable 18 within the bore hole is an instrument represented generally by an elongated cylindrical housing 20. The cable 18 passes over a suitable cable measuring reel or drum 22 which in any suitable well-known manner provides an indication of the amount of cable payed out and thus the depth of the instrument 20 in the bore hole at any time. The upper end of the cable 18 is connected to a suitable amplifier 24, the output of which is in turn conducted to two recorders 26 and 28, the purposes of which will be described hereinafter. The upper end of the well may be provided with a suitable casing head 30 containing a packing gland 32 for the cable 18 and the casing head 30 is preferably provided with an outlet conduit 34 which may contain a flow meter 36. Surrounding the lower portion of the instrument 20 are a pair of spaced apart annular flexible sealing rings 38 of rubber or the like, these rings being secured to the exterior of the instrument housing 20 and being adapted to engage the walls of the bore hole or the casing 14. That portion of the housing 20 between the sealing members 38 is provided with one or a plurality of openings 40 extending through the wall to the interior of the instrument and the fluid entering the well through the perforations 16a is indicated by the arrows as entering the instrument housing through these openings 40.

In Fig. 1 fluid is shown as entering the bore hole from the formation 12 through the casing perforations 16. This fluid may be gas, oil or water or mixtures thereof or it may be that gas is flowing into the hole from say the upper portion of the formation 12, oil from the middle and water from the lower portion. As has been stated hereinbefore, applicants' invention is directed to making a determination as to whether the fluid entering the hole from a portion of the formation 12, as through the casing perforations 16a is gas, oil and/or water and the rate at which that fluid is entering the hole from that portion of the formation.

In Figs. 2 through 5 an enlarged sectional view of the instrument 20 is illustrated. In Figs. 2 and 5 one of the openings 40 is shown as extending from the annular space 42 defined by the casing 14, housing 20 and sealing members 38 into a vertical chamber 44. The upper end of the chamber 44 is connected by annular passage 46 to an upper chamber 48, the upper end of which is connected through radial ports or openings 50 to the space in the bore hole above the instrument 20. Thus it will be seen that fluid entering the bore hole through the casing perforations 16a passes into the lower portion of the chamber 44, upwardly through that chamber then through the passage 46 to the lower end of the upper chamber 48 and then outwardly into the bore hole above the instrument. The housing 20 is also provided with a vertical passage or passages 52, these passages being open at the bottom and connected through openings 54 to the interior of the bore hole above the upper sealing ring 38. These passages serve as the means whereby the fluid in the bore hole below the instrument can pass upwardly through the bore hole while by-passing the measuring chambers 44 and 48.

Disposed within the lower end of the instrument 20 is a source 56 of penetrative radiation, preferably gamma rays, such as a small amount of radium or one of the radioactive isotopes. Axially disposed above the source 56 and at the upper end of the chamber 44 is a gamma ray detector 58 of any suitable type. Both the source 56 and the detector 58 are shown as partially surrounded by suitable gamma ray shielding material 60 such as lead or another high atomic number metal, for example, tungsten. As shown, gamma rays from the source 56 will pass upwardly through the chamber 44 to strike the detector 58 and the intensity of the gamma rays reaching the detector will vary with the density of the fluid within the chamber 44. The detector 58 is connected electrically by suitable wires, not shown, to a power supply and preamplifier 62, the output of which in turn is connected through the cable 18 to the amplifier 24 at the surface and then to the recorder 26.

Assuming that gas is entering the bore hole through the casing perforations 16a, this gas will pass upwardly through the chamber 44 and then through the passage 46 and chamber 48 to the interior of the bore hole above the instrument. Since, compared with oil or water, gas is a very light material, but few of the gamma rays from the source 56 will be absorbed within the chamber 44 and the output of the detector 58 will indicate a fairly high intensity. The recorder 26 will thus indicate that gas is the fluid entering the bore hole at that particular position of the instrument within the hole. If oil instead of gas is entering through the perforations 16a the detector 58 and the recorder 26 will indicate a lower detector output due to the greater density of the oil and if water is the fluid entering through the perforations 16a a still lower output will be recorded. The record or log will thus show the nature of the fluid entering the bore hole at the depth defined by the space 42 surrounding the instrument 20.

Disposed within the upper chamber 48 is a means for measuring flow rates, shown in this instance as a small ball or float 64 containing a small amount of penetrative radiation such as gamma rays. Disposed above and axially of the chamber 48 is a second gamma ray detector 66 also partially surrounded by gamma ray absorbing material 68 such as lead or tungsten. The chamber 48 is shown as tapered or cone shaped in vertical section and as the fluid from the passage 46 passes upwardly through the chamber 48 the gamma ray source 64 will move upwardly in the chamber and assume a position at a distance from the detector 66 which will depend upon the rate of flow of the fluid through the chamber. The detector 66 is also connected by wires, not shown, to the power source of preamplifier 62 and thence through the cable 18 to the preamplifier 24 and the recorder 28. If the fluid is entering the bore hole through the casing perforations 16a at a high rate, it will pass upwardly through the chamber 48 at a proportionately high rate and the source 64 will move up toward the detector 66. The detector output will then be high due to the proximity of the source 64 and the recorder 28 at the surface will indicate the high rate of flow of the well fluid. Conversely, if the fluid entering through the perforations 16a has a low rate of flow the source 64 will remain lower in the chamber 48 and at a greater distance from the detector 56 so that the recorder 28 will indicate the lower flow rate.

The wall of the housing 20 is shown in Fig. 2 as provided with an opening or port 70 for permitting some of the well fluid from the passage 46 to pass outwardly into the bore hole by-passing the chamber 48. By varying the size of the port 70 in any suitable manner to suit the requirement of the well being surveyed, the range of the flow meter 64—48—66 can be extended if desired.

In Fig. 6 the instrument of Fig. 2 is shown in an upside down position. The instrument can be used in this position for making a permeability profile, i.e., determining the relative permeabilities of the formations surrounding the bore hole. To make such a determination the instrument will be positioned in the hole as indicated at a known depth and a fluid will be pumped downwardly through the bore hole at a constant rate as indicated by the arrow 80. This fluid will pass downwardly through the passage 52a, out through the opening 54a, and downwardly where it will enter the instrument through the openings 50a. In this case, the chamber 48a is tapered so as to expand upwardly as in Fig. 2 and the pumped fluid after entering through openings 50a will pass upwardly to the chamber 48a thus moving the radioactive source 64a to some position with respect to the detector 66a. The fluid then passes through the passage 46a and through the chamber 44a and openings 40a into the space between the flexible sealing members 38a and from there outwardly through the casing perforations 16b into the permeable formation being examined. The more permeable this formation the faster the fluid will flow into it and this rate of flow will be indicated by the output of the detector 66a. When the instrument is lowered or raised to a position opposite another portion of the formation the detector output will be indicative of the permeability of that portion of the formation in a similar manner and in this way a permeability profile log of any portion of the formation surrounding the bore hole can be made. When the instrument is used in this slightly modified form the source 56 and the density detector 58 of Fig. 2 will, of course, not be necessary. It is to be understood that the detector 66a is connected through the power supply-preamplifier 62a to the cable 18a by wiring which has been omitted from the drawing for reasons of clarity. In the making of an injectivity permeability log in this manner the necessity for a tubing string in the hole and a radioactive tracer in any of the well fluid is eliminated. These, obviously, are important advantages.

Obviously many modifications and variations of the invention as hereinabove set forth may be made without departing from the spirit and scope thereof and therefore only such limitations should be imposed as are indicated in the appended claims.

We claim:

1. An apparatus adapted to be passed through a bore hole for determining the density and flow rate of fluid flowing into said hole at a predetermined depth comprising an elongated substantially cylindrical instrument housing adapted to be suspended from a conductor cable, flexible sealing means surrounding a portion of said housing and adapted to engage the walls of the bore hole so as to provide a confined space around said housing portion, said housing being provided with a vertical chamber opening at its lower portion into said confined space and at its upper portion into the well bore above said sealing means whereby the fluid flowing into the bore hole from the formation opposite said housing portion is caused to flow through said chamber on its way up the hole, means disposed within said cylindrical housing for measuring the density of fluid flowing through said chamber and means associated with said chamber for measuring the rate of flow of at least a portion of said fluid flowing through said chamber.

2. An apparatus as described in claim 1 in which said density measuring means comprises a source of gamma radiation and a gamma ray detector disposed longitudinally of a portion of said chamber and separated by a fixed distance, and means for recording the output of said detector.

3. An apparatus as described in claim 1 in which said flow rate measuring means comprises a movable source of gamma rays disposed in a portion of said chamber, a gamma ray detector disposed in alignment with said chamber portion, and means for recording the output of said detector, said source being adapted to move toward said detector a distance depending upon the rate of flow of the fluid through said chamber portion.

4. Apparatus for making a log of a well bore hole traversing a subsurface formation comprising means for providing a fluid-tight passageway for fluids flowing between a predetermined formation zone and the bore hole and means disposed in said passageway means for measuring the density of the fluid flowing between said predetermined formation zone and the bore hole.

5. Apparatus as set forth in claim 4 further including means disposed in said passageway means for simultaneously measuring the rate of flow of the fluid flowing between said formation zone and the bore hole.

6. Apparatus for making a productivity log of a well borehole to determine the nature, location and rate of flow of fluid flowing into the borehole which comprises means for sealing off a predetermined interval of the wall of said borehole so as to provide a passage for fluid flowing therefrom into said borehole, means for measuring the density of the fluid flowing into the hole from said predetermined interval and means for simultaneously measuring the rate of flow of fluid flowing into the hole from said predetermined interval.

7. Apparatus as set forth in claim 6 wherein said fluid density measuring means includes a fixedly spaced source and detector of gamma rays.

8. Apparatus as set forth in claim 6 wherein said fluid flow rate measuring means includes a gamma ray detector and a movable source of gamma rays disposed in said fluid passage.

9. Apparatus for making a log of a borehole traversing subsurface formations comprising an exploring unit adapted to be moved through said borehole, said exploring unit including means for sealing off a predetermined vertical extent of the wall of said borehole, a fluid passageway communicating with said sealing off means and means disposed within said passageway for measuring the density of fluids passing through said passageway and recording means coupled to the output of said density measuring means.

10. Apparatus as set forth in claim 9 wherein said exploring unit further includes means disposed in said fluid passageway for measuring the rate of flow of fluid through said passageway.

11. Apparatus as set forth in claim 10 wherein said means for measuring the rate of flow of the fluid includes a gamma ray detector and a gamma ray source disposed in said passageway so that the gravitational force acting on said source is in a direction opposite to the force of the fluid passing through the passageway tending to move the source toward said gamma ray detector, the position of said gamma ray source with respect to said gamma ray detector being dependent upon the rate of fluid flow through the passageway.

12. Apparatus for making a log of a borehole traversing subsurface formations comprising an exploring unit adapted to be moved through a borehole, said unit comprising means for sealing off a predetermined vertical extent of the wall of the borehole, a fluid passageway communicating with said sealing off means and means for measuring the fluid flow rate through said passageway, said fluid flow rate measuring means including a gamma ray detector and a gamma ray source disposed in said passageway at a point spaced from said detector, said passageway being adapted to pass fluid in a direction opposite to the force of gravity on said gamma ray source so that the position of said source with respect to said detector depends upon the rate of flow fluid through the passageway, and recording means coupled to the output of said gamma ray detector.

(References on following page)

References Cited in the file of this patent

UNITED STATES PATENTS

| | | |
|---|---|---|
| 2,228,623 | Ennis | Jan. 14, 1941 |
| 2,273,215 | Neufeld | Feb. 17, 1942 |
| 2,316,239 | Hare | Apr. 13, 1943 |
| 2,425,868 | Dillon | Aug. 19, 1947 |
| 2,554,715 | Mellett | May 29, 1951 |
| 2,599,975 | Carpenter | June 10, 1952 |
| 2,688,872 | Hartline et al. | Sept. 14, 1954 |
| 2,700,734 | Egan et al. | Jan. 25, 1955 |
| 2,701,960 | Irwin | Feb. 15, 1955 |
| 2,709,365 | Piety | May 31, 1955 |
| 2,714,168 | Hencke et al. | July 26, 1955 |
| 2,725,486 | Walstrom | Nov. 29, 1955 |
| 2,735,944 | Greer | Feb. 21, 1956 |